United States Patent
Chen et al.

(10) Patent No.: US 10,977,158 B1
(45) Date of Patent: Apr. 13, 2021

(54) FIRMWARE BOOT TRACING

(71) Applicant: QUANTA COMPUTER INC., Taoyuan (TW)

(72) Inventors: Cheng-Han Chen, Taoyuan (TW); Cheng-Han Wu, Taoyuan (TW); Jyun-Jie Huang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/832,609

(22) Filed: Mar. 27, 2020

(51) Int. Cl.
*G06F 9/44* (2018.01)
*G06F 11/36* (2006.01)
*G06F 9/4401* (2018.01)

(52) U.S. Cl.
CPC ........ *G06F 11/3636* (2013.01); *G06F 9/4401* (2013.01)

(58) Field of Classification Search
CPC ........................................................ G06F 9/44
See application file for complete search history.

(56) References Cited

U.S. PATENT DOCUMENTS

| | | | |
|---|---|---|---|
| 2009/0089584 A1* | 4/2009 | Bender | H04L 9/3247 713/176 |
| 2010/0290468 A1* | 11/2010 | Lynam | H04L 45/742 370/392 |
| 2020/0019717 A1* | 1/2020 | Steffey | H04L 9/3239 |

\* cited by examiner

*Primary Examiner* — Jae U Jeon
(74) *Attorney, Agent, or Firm* — Nixon Peabody LLP

(57) ABSTRACT

Firmware can be built to be capable of generating and outputting trace data, during execution, to assist in debugging firmware problems without substantially slowing operation of the firmware and without potentially disclosing secret information associated with the firmware. The firmware (e.g., BIOS) can output hash digests of various modules within the firmware, which can be compared with a pre-established mapping table to identify modules that successfully completed or did not successfully complete during execution of the firmware, such as during a startup procedure. The hash digest can be a one-way hash, which can be rapidly executable during operation of the firmware and can keep the code of the modules hidden from unauthorized reverse engineering.

15 Claims, 8 Drawing Sheets

| Firmware Sequence (220) | POST Code (222) | Trace Data (224) |
|---|---|---|
| 226 POST Start | | |
| 228 Phase A | 0x10 | |
| 240 A Module | | 260 A Module Hash Digest |
| 241 B Module | | 261 B Module Hash Digest |
| 242 C Module | | 262 C Module Hash Digest |
| 230 Phase B | 0x20 | |
| 243 D Module | | 263 D Module Hash Digest |
| 244 E Module | | 264 E Module Hash Digest |
| 245 F Module | | 265 F Module Hash Digest |
| 232 Phase C | 0x30 | |
| 246 G Module | | 266 G Module Hash Digest |
| 247 H Module | | 267 H Module Hash Digest |
| 248 I Module | | 268 I Module Hash Digest |
| 249 J Module | | 269 J Module Hash Digest |
| 250 K Module | | 270 K Module Hash Digest |
| 234 Phase D | 0x40 | |
| 251 L Module | | 271 L Module Hash Digest |
| 252 M Module | | 272 M Module Hash Digest |
| 253 N Module | | 273 N Module Hash Digest |
| 254 O Module | | 274 O Module Hash Digest |
| 255 P Module | | 275 P Module Hash Digest |
| 236 POST End | 0x50 | |
| 256 Q Module | | 276 Q Module Hash Digest |
| 257 R Module | | 277 R Module Hash Digest |
| 238 OS Runtime | 0x60 | |
| 258 S Module | | 278 S Module Hash Digest |
| 259 T Module | | 279 T Module Hash Digest |

FIG. 2

FIRMWARE BOOT TRACING

TECHNICAL FIELD

The present disclosure relates to computers generally, and more specifically to monitoring the firmware procedures of a computing system during bootup, such as the procedures of a Basic Input/Output System (BIOS).

BACKGROUND

Modern computing systems, such as those found in server farms or datacenters, make use of a basic input/output system (BIOS) to support normal operations. A BIOS is a firmware that can help initialize and test operation of a computing system's components, as well as perform other duties while the computing system is running an Operating System (OS). The internal workings of a BIOS can be an important and valuable trade secret for a computing company, however there is also a need to ensure problems that occur during bootup can be adequately ascertained. There is a need for a BIOS capable of providing suitable debugging information without also increasing the risk of inadvertent disclosure. Additionally, since the BIOS is run each time the computing system is powered on, there is a need to keep BIOS bootup times short to minimize any unusable downtime of the computing system.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include systems, methods, and computer-program products for accessing firmware comprising a plurality of modules, wherein each of the plurality of modules comprises code to facilitate operation of a computing system. The method can include running each of the plurality of modules, wherein running a module of the plurality of modules comprises generating a hash digest using the module; outputting the hash digest; and executing the code of the module.

The systems can comprise one or more data processors and a non-transitory computer-readable storage medium containing instructions which, when executed on the one or more data processors, cause the one or more data processors to perform the method. The computer-program products can be tangibly embodied in a non-transitory machine-readable storage medium, including instructions configured to cause a data processing apparatus to perform the method.

In some cases, running a module can further comprise selecting a protocol from a plurality of protocols of the module, wherein executing the code of the module comprises executing code of the protocol; accessing a protocol global uniform identifier (GUID) associated with the selected protocol; and outputting the protocol GUID associated with the selected protocol. In some cases, outputting the hash digest comprises appending the hash digest to a trace data file. In some cases, the method can further comprise receiving a priority interrupt signal; and outputting the trace data file in response to receiving the priority interrupt signal. In some cases, the method can further comprise initializing a timer, wherein completion of the timer is associated with non-completion of at least one of the plurality of modules; and sending the priority interrupt signal in response to completion of the timer. In some cases, the firmware is a basic input/output system (BIOS).

BRIEF DESCRIPTION OF THE DRAWINGS

The specification makes reference to the following appended figures, in which use of like reference numerals in different figures is intended to illustrate like or analogous components.

FIG. 2 is a block diagram depicting a firmware sequence and its associated POST code and trace data, according to certain aspects of the present disclosure.

DETAILED DESCRIPTION

Figure 1:
FIG. 1 is a block diagram depicting an environment for generating a mapping table for a firmware image, according to certain aspects of the present disclosure.

Certain aspects and features of the present disclosure relate to generating and outputting trace data, during execution of firmware, to assist in debugging firmware problems without substantially slowing operation of the firmware and without potentially disclosing secret information associated with the firmware. The firmware (e.g., BIOS) can output hash digests of various modules within the firmware, which can be compared with a pre-established mapping table to identify modules that successfully completed or did not successfully complete during execution of the firmware, such as during a startup procedure. The hash digest can be a one-way hash, which can be rapidly executable during operation of the firmware and can keep the code of the modules hidden from unauthorized reverse engineering.

When a computing system is powered on or otherwise initialized, a Power-On Self-Test (POST) routine is performed, often by the BIOS. The POST routine can involve executing numerous modules, each of which can be responsible for initializing and/or testing various components of the computing system. The BIOS can output a POST code, usually through a known port (e.g., port 0x80), which can indicate whether or not the POST routine has passed through certain major checkpoints (e.g., phases) in the POST routine. These POST codes can be monitored live or recorded for future review. Engineers can use POST code sequences to understand which phase of the bootup process is currently executing or in which phase the bootup process fails. POST codes are generally only a single byte in size and are only associated with certain major checkpoints in the POST routine. Therefore, since the number of available unique POST codes remains limited, the POST code can only function as an indication of broadly where a failure may have occurred, and is not capable of precisely identifying in which module the error occurred.

In formal BIOS releases, such as those found on end-user equipment, there is an inherent need for bootup procedures to be quick, and thus a formal BIOS release provides minimal debugging information, such as only providing POST codes. However, a Debug BIOS is a special, purpose-built version of a BIOS that is built by an engineer developing the BIOS in question, and which can output additional debugging messages while the BIOS carries out its bootup processes. The Debug BIOS may be built specifically to output various debugging information during the bootup process, thereby permitting an engineer to accurately track what happens during the bootup process and where an error is occurring. While such a Debug BIOS may be very useful for internal engineers, it is not suitable for use by end users and third parties, since the debugging messages that are output may expose secret (e.g., trade secret) information about the BIOS firmware, and because the process of outputting so many debugging messages may drastically slow the bootup process. Thus, a Debug BIOS is not suitable for use in any formal releases.

While described with reference to a BIOS during bootup and operating system (OS) runtime, the techniques disclosed herein can be used with any suitable firmware. Certain aspects of the present disclosure can be used with any suitable firmware interface, such as Unified Extensible Firmware Interface (UEFI).

A firmware image can contain multiple modules. Each module can contain code suitable for a particular purpose, such as to help initialize and/or test various pieces of hardware associated with the computing system upon which the firmware is being run. The code of each module can, when executed, facilitate operation of the computing system, such as bootup of the computing system. A single module can include any number of functions (e.g., subroutines or methods) that are called or executed to perform various operations. In some cases, the code from a module can be organized into protocols. Each protocol can contain code specific to a certain computing environment, which is only executed when the firmware is run in that particular computing environment. Thus, while a single module can be associated with a particular task, it can contain different protocols that can contain slightly different code to complete that task in different computing environments. For example, a single module of a firmware can contain a first protocol that can be used in a first computing environment and a second protocol that can be used in a different, second computing environment. Thus, a single firmware image, when executing a particular module, can execute different code depending on which protocol is being used for the computing environment executing the firmware image. Each protocol can be assigned a globally unique identifier (GUID). Optionally, the modules can be organized in various phases. In a POST routine, the different POST codes are associated with different phases. Thus, a POST code may be indicative of a certain set of modules, but not any particular module.

As disclosed herein, the code of a firmware image can include trace data code designed to output trace data. This trace data code can be included within some or all of the modules of the firmware, or can be present in a separate module. The trace data code can output a hash digest associated with one or more modules being executed. The hash digest can be output on its own, can be stored as a trace data file, or can be appended to an existing trace data file. As used herein, the term outputting can refer to outputting via a port (e.g., a serial port), recording to a file, storing in memory, or otherwise facilitating transfer of the data (e.g., hash digest) to a user. Trace data (e.g., hash digests and/or protocol globally unique identifiers, as described herein) can be stored in any suitable location, such as within a baseboard management controller, system memory, or other onboard flash memory.

When firmware as disclosed herein is first built, it can be built to include the trace data code. Prior to compiling the firmware, such as compiling the firmware as a formal release, the firmware can be used to generate a mapping table. This mapping table can map module information with hash digests of modules. For each module, the module can be passed through a hashing function to generate a hash digest. This hash digest can be associated, in a mapping table, with module information of the module. The mapping table can be retained by the builder of the firmware to keep the mapping of hash digests to module information secret. Module information can be any desired information associated with the module, including original code, pseudocode, description, title, name, module identification, or any other such information.

In some cases, the hash mapping table can be generated as a part of compiling the firmware image, although that need not always be the case. When generating a hash digest, any suitable hashing algorithm can be used. In some cases, a hashing algorithm selected from a set of hashing algorithms can be used. For example, a hashing algorithm can be selected based on its ability to rapidly encode the modules of the firmware. In some cases, a hashing algorithm can be selected based on a hashing algorithm pre-programmed into the code of the firmware.

Generating a hash digest can include passing an entire module or a portion of the module through the hashing function. The hash digest can be based on hashing the portion of the firmware image associated with that particular module (e.g., post-compiled code). In certain cases, the hash digest is generated by passing a bit stream associated with a particular module (e.g., the bit stream resultant from compiling the firmware) through a hashing function, then storing the resultant hash digest in the hash mapping table in association with (e.g., in the same record as) an indicator of that particular module. Thus, as the firmware is being compiled by the compiler, the output bit stream can be passed through the hashing function to generate hash digests associated with different aspects of the firmware code. In some cases, a hash digest will be generated for each module of the firmware. In some cases, a hash digest can be generated for each function of the firmware. In some cases, a hash digest can be generated for each phase of the firmware. In some cases, hash digests can be generated for different units of the firmware, such as groupings of modules and/or functions.

In some cases, each module can contain one or more protocols. Each protocol can have a GUID. When the mapping table is being generated, one or more protocol GUIDs can be stored in the mapping table.

In use, whenever the firmware is executed, the firmware will generate a hash digest in real time for each module being executed. This hash digest can be output (e.g., saved or otherwise transferred as trace data). When the system is running normally, the firmware will operate at nearly the same speeds as previous formal releases, although it will output various hash digests. Output of all hash digests can be indicative of a successful execution of the firmware. However, if the system ceases outputting hash digests prematurely or if there is an error in the outputting of the hash digests (e.g., undesired repetitions or digests out of order), it can be indicative of an error during execution of the firmware. More specifically, the hash digests that have been output can be analyzed using the mapping table to determine exactly which modules may have malfunctioned.

In addition to operating during bootup, in some cases, certain aspects of the present disclosure can be used to output trace data during OS Runtime. OS Runtime is a portion of the firmware that is being executed while the OS is in operation. In some cases, a system management interrupt (SMI) can be triggered, which can result in the execution of certain firmware code associated with the system management mode (SMM). The firmware can execute the SMM code and output trace data (e.g., runtime trace data) associated with the SMM code. If desired, runtime trace data can be stored in the same location or a different location from other trace data (e.g., bootup trace data).

In some cases, a priority interrupt can be used to initiate outputting of trace data. Use of a priority interrupt to initiate outputting trace data can be especially useful to diagnose and debug errors that cause system hangs or rests. In some cases, a watchdog timer can be initiated to monitor POST code sequences being output, such that if the expected POST code is not output before expiration of the timer, a priority interrupt command can be sent to initiate outputting of trace data. In some cases, a baseboard management controller (BMC) can be used to monitor POST code sequences being output and output a priority interrupt command to initiate outputting of trace data if the desired POST code sequences are not received by the BMC. In some cases, the firmware (e.g., BIOS) can initiate a timer to monitor the execute in place (XIP) register of a central processing unit (CPU). As the CPU executes different pieces of code the XIP register will update to point to the piece of code currently being executed. Thus, if the XIP register fails to update, appears to be pointing to an incorrect piece of code, or continued to point to the same set of pieces of code in a repeating loop, an assumption can be made that the system has hung or is in a perpetual loop. Thus, if the timer monitoring the XIP register expires without the XIP register updating or without the XIP register updating to a particular piece of code (e.g., a new piece of code or a particular expected piece of code), a determination can be made that the system is hung or in a perpetual loop, and appropriate action can be taken, such as a priority interrupt command being sent to initiate outputting of trace data. When the priority interrupt is received, the execution of the firmware can be redirected to a specific section of code, such as the trace data code. Execution of this specific section of code can result in outputting the trace data, optionally including an event record associated with the priority interrupt command. After the trace data has been output, the system can be permitted to restart, or execution of the firmware can be directed to a particular module or section of code (e.g., the module that was executing prior to the error or the module following the module that was executing prior to the error).

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a block diagram depicting an environment 100 for generating a mapping table 104 for a firmware image 102, according to certain aspects of the present disclosure. The firmware image 102 can be any suitable firmware image stored in any suitable location, such as a BIOS stored on a read only memory chip of a computing system. The firmware image 102 can include N different modules, such as A Module 104, B Module 106, and on up to N Module 108. Any number of modules can be used. Each module can comprise code, which when executed by one or more processes, facilitates startup and/or operation of a computing system.

The firmware image 102 can be associated with a mapping table 104. The mapping table 104 can be generated when the firmware image 102 was compiled. The mapping table 104 contains N entries of module information associated with a module hash digest. For example, the mapping table 104 can include A Module Information 114 as being associated with A Module Hash Digest 124, which is a hash digest of A Module 104 of the firmware image 102. Likewise, the mapping table 104 can include B Module Information 116 as being associated with B Module Hash Digest 126, which is a hash digest of B Module 106 of the firmware image 102. Likewise, the mapping table 104 can include N Module Information 118 as being associated with N Module Hash Digest 128, which is a hash digest of N Module 108 of the firmware image 102.

Thus, by receiving a hash digest based on one of the modules 104, 106, 108 of the firmware image 102, one could use the mapping table 104 to identify the module information 114, 116, 118 associated with the received hash digest 124, 126, 128.

FIG. 2 is a block diagram depicting a firmware sequence 220 and its associated POST code 222 and trace data 224, according to certain aspects of the present disclosure. The firmware sequence 220 can be the sequence of modules for any suitable firmware, such as a bootup BIOS. The firmware sequence 220 can include several phases, such as a POST start 226, a Phase A 228, a Phase B 230, a Phase C 232, a Phase D 234, a POST end 236, and an OS Runtime 238, although any combination of these and other phases can be used. Each phase can include any number of modules, each module having code associated to that module's phase. During execution of the firmware sequence 220, one or more processors can sequentially execute each of the modules of the sequence 220. Whenever certain phases start or complete, the firmware can output an associated POST code, such as code "0x30" for Phase C 232 or code "0x60" for OS Runtime 238.

As depicted in FIG. 2, the firmware sequence 220 includes the following modules, although other modules can be used: A Module 240, B Module 241, C Module 242, D Module 243, E Module 244, F Module 245, G Module 246, H Module 247, I Module 248, J Module 249, K Module 250, L Module 251, M Module 252, N Module 253, O Module 254, P Module 255, Q Module 256, R Module 257, S Module 258, and T Module 259. These modules are split up amongst the phases 226, 228, 230, 232, 234, 236, 238 of the firmware sequence.

As described herein, the firmware can be caused to output trace data associated with each module. For example, A Module Hash Digest 260 is associated with A Module 240, B Module Hash Digest 261 is associated with B Module 241, C Module Hash Digest 262 is associated with C Module 242, D Module Hash Digest 263 is associated with D Module 243, E Module Hash Digest 264 is associated with E Module 244, F Module Hash Digest 265 is associated with F Module 245, G Module Hash Digest 266 is associated with G Module 246, H Module Hash Digest 267 is associated with H Module 247, I Module Hash Digest 268 is associated with I Module 248, J Module Hash Digest 269 is associated with J Module 249, K Module Hash Digest 270 is associated with K Module 250, L Module Hash Digest 271 is associated with L Module 251, M Module Hash Digest 272 is associated with M Module 252, N Module Hash Digest 273 is associated with N Module 253, O Module Hash Digest 274 is associated with O Module 254, P Module Hash Digest 275 is associated with P Module 255, Q Module Hash Digest 276 is associated with Q Module 256, R Module Hash Digest 277 is associated with R Module 257, S Module Hash Digest 278 is associated with S Module 258, and T Module Hash Digest 279 is associated with T Module 259. In some cases, the trace data 224 can include additional information, such as a GUID associated with one or more protocols accessed within one or more modules.

Therefore, whenever a particular module is called, executed, completed, hangs, or otherwise causes an output of trace data, the trace data that is outputted can be used to pinpoint exactly which module caused the issue. For example, in some cases where the hash digest is output upon calling a module, if a system running the firmware sequence 220 hangs after outputting A Module Hash Digest 260, B Module Hash Digest 261, C Module Hash Digest 262, D Module Hash Digest 263, E Module Hash Digest 264, F Module Hash Digest 265, G Module Hash Digest 266, H Module Hash Digest 267, and I Module Hash Digest 268, it can be assumed that either an error occurred during execution of I Module 248. Without the trace data 224, the only indication of an error may have been a POST code 222 associated with Phase C 232 or Phase B 230, such as "0x30" or "0x20," respectively. Further, if a protocol GUID is present in the trace data 224, the protocol GUID can be used to indicate which portions of code (e.g., which functions) within a module were last executed or were attempted to be executed when the issue occurred.

While FIG. 2 depicts a certain number of phases and modules, it will be understood that any number of phases and modules may be used. Certain aspects of the present disclosure are increasingly useful when the number of modules per phase exceeds one.

Figure 3:
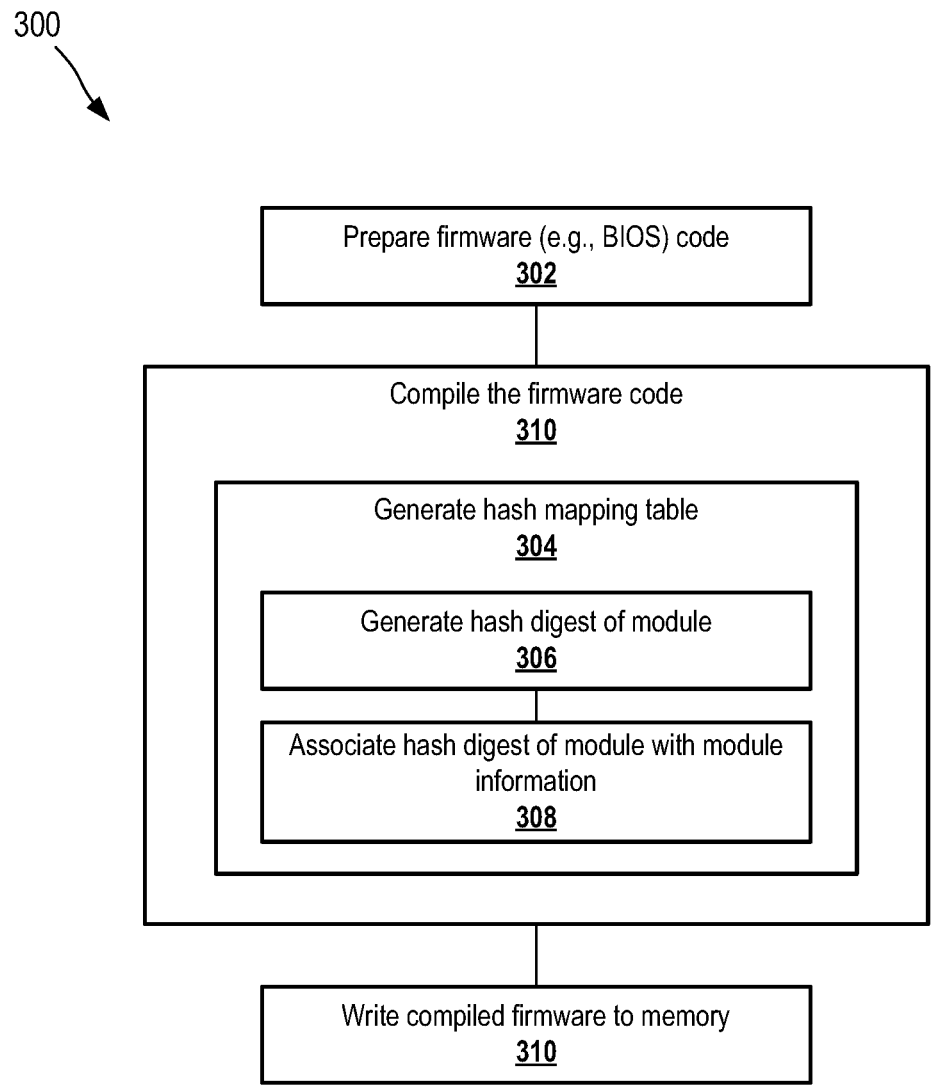
FIG. 3 is a block diagram depicting a process for preparing a firmware image and associated mapping table, according to certain aspects of the present disclosure.

FIG. 3 is a block diagram depicting a process 300 for preparing a firmware image and associated mapping table, according to certain aspects of the present disclosure. The process 300 can begin with preparing the firmware (e.g., BIOS) code at block 302. Preparing the code can include writing, composing, or otherwise obtaining the code. In some cases, preparing the firmware code at block 302 can include generating trace data code designed to output trace data as disclosed herein. In some cases, preparing the firmware code at block 302 can include generating code for outputting a hash digest of a module. In some cases, preparing firmware code at block 302 can include selecting a hashing algorithm. In some cases, preparing firmware code at block 302 can include associating (e.g., attributing) a protocol GUID to each protocol.

At block 310, the firmware code can be compiled into a firmware image (e.g., firmware image 102 of FIG. 1). Compiling the firmware code can be performed using any suitable compiler or a purpose-built compiler. In some cases, compiling the firmware code at block 310 can include generating the hash mapping table at block 304, however in some cases generating the hash mapping table at block 304 can occur separately from compiling the firmware code at block 310. In some cases, compiling the firmware code at block 310 can include compiling the code to output a bit stream of the compiled firmware code. This bit stream can be used to generate the hash mapping table at block 304.

Generating the hash mapping table at block 304 can involve generating a mapping table (e.g., mapping table 104 of FIG. 1) that contains hash digests and module information associated with the modules of the firmware code prepared at block 302. Generating the hash mapping table at block 304 can involve performing blocks 306 and 308 repeatedly for each of the modules of the firmware. At block 306, a hash digest can be generated from the module. Generating the hash digest at block 306 can include using a hashing algorithm (e.g., the hashing algorithm selected at block 302) on the bit stream data associated with the module for which the hash digest is being created. At block 308, the hash digest generated at block 306 can be associated with module information of the module for which the hash digest is being created. Module information can be obtained directly from the firmware code prepared at block 302, although that need not always be the case.

After the firmware code has been compiled at block 310, the compiled firmware (e.g., firmware image, such as firmware image 102 of FIG. 1) can be written to a memory at block 310, such as a non-volatile read-only memory, although other memory can be used.

Figure 4:
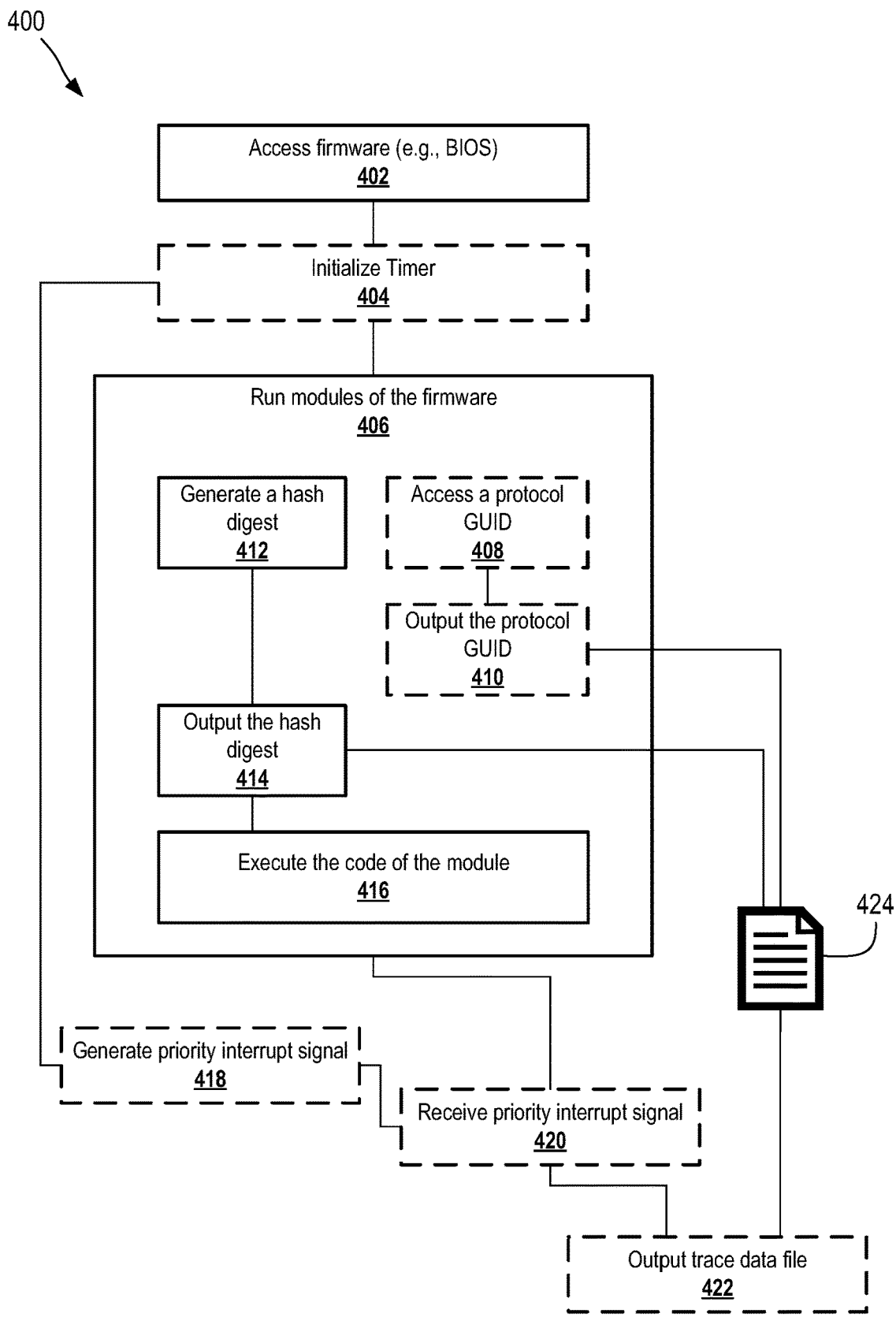
FIG. 4 is a block diagram depicting a process for using a firmware image that generates trace data, according to certain aspects of the present disclosure.

FIG. 4 is a block diagram depicting a process 400 for using a firmware image that generates trace data, according to certain aspects of the present disclosure. The firmware image can be firmware image 102 of FIG. 1. At block 402, the firmware (e.g., a BIOS) can be accessed.

At block 406, each module of the firmware can be run (e.g., executed). Running a module can include performing blocks 412, 414, 416, as well as optional blocks 408, 410. At block 412, a hash digest is generated based on the module. The hash digest can be generated by passing the portion of the firmware image associated with the module or a preset portion of the module through a hashing algorithm. At block 414, the hash digest can be output, as described herein. In some cases, outputting the hash digest can include generating or appending to a trace data file 424 with the hash digest. The trace data file 424 can contain trace data, such as trace data 224 of FIG. 2. At block 416, the code of the module can be executed. In some cases, executing the code of the module at block 416 can occur before generating and outputting the hash digest at blocks 412, 414, although that need not always be the case.

At optional block 408, a protocol GUID can be accessed. This protocol GUID can be output at block 410. In some cases, outputting the protocol GUID can include generating or appending to a trace data file 424 with the protocol GUID.

In some cases, at optional block 420, a priority interrupt signal can be received. Upon receipt of the priority interrupt signal at block 420, code can be executed to output the trace data (e.g., the trace data file) at optional block 422. The priority interrupt signal can be received from any suitable source. In some cases, the priority interrupt signal can be generated at optional block 418 in response to elapsing of a timer at optional block 404. The timer at block 404 can be initialized prior to running one or more modules of the firmware at block 406, and can be designed to be reset and/or cancelled in association with completion of the one or more modules run at block 406. Thus, failure to run the one or more modules at block 406 can result in the timer elapsing, thus initiating generation of the priority interrupt signal at block 418.

In some cases, outputting the protocol GUID at block 410 and/or outputting the hash digest at block 414 (and optionally generating the hash digest at block 412) can occur only in response to receiving the priority interrupt signal at block 420. In such cases, the trace data is not generated until after the priority interrupt signal is received. However, that need not always be the case, and in some cases trace data can be generated and/or output without receiving a priority interrupt signal at block 420.

While blocks 406, 412, 414, 416 are described herein in relation to a particular module (e.g., running a module, generating a hash digest of the module, outputting the hash digest of the module, and executing the code of the module), in some cases the same blocks can instead or additionally be performed in relation to a particular function within a module (e.g., running a function, generating a hash digest of the function, outputting the hash digest of the function, and executing the code of the function).

Figure 5:
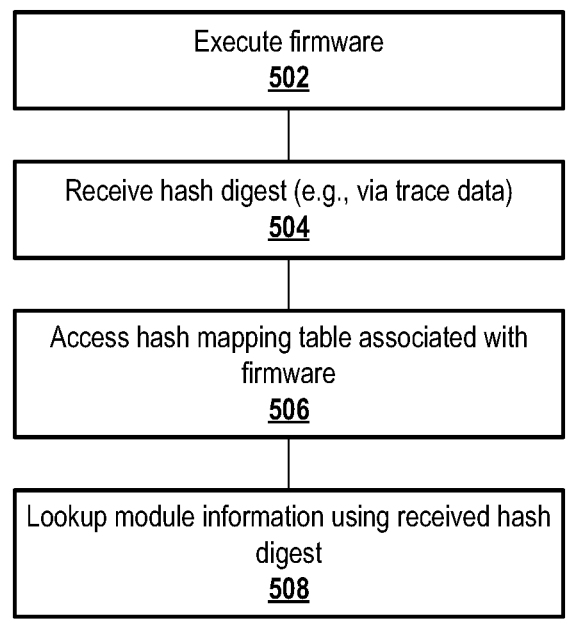
FIG. 5 is a block diagram depicting a process for decoding trace data, according to certain aspects of the present disclosure.

FIG. 5 is a block diagram depicting a process 500 for decoding trace data, according to certain aspects of the present disclosure. At block 502, the firmware is executed. Execution of the firmware at block 502 can be successful or not successful, and can generate trace data, such as trace data 224 of FIG. 2. At block 504, one or more hash digests can be received, such as via trace data (e.g., a trace data file, such as trace data file 424 of FIG. 4). At block 506, a hash mapping table is accessed. The hash mapping table is associated with the firmware (e.g., mapping table 104 and firmware image 102 of FIG. 1). In some cases, accessing the hash mapping table at block 506 can include selecting the hash mapping table from a number of hash mapping tables based on information in the received trace data, although that need not always be the case. For example, information in the received trace data can contain information about a version of the firmware, which can be used to identify a particular hash mapping table to use. At block 508, module information can be looked up using the received hash digest(s). Looking up module information can comprise comparing the received hash digest to the hash digests in the mapping table until a match is found, and then identifying the module information associated with the matched hash digest. In some cases, existing protocol information or information in the received trace data can be used to determine whether the trace data represents modules and/or functions that have been successfully executed or modules and/or functions that were attempted to be executed. In other words, a determination can be made in advance (e.g., via an existing protocol) or on the fly (e.g., via information in the received trace data) as to whether the presence of a hash digest is indicative that execution of the module and/or function associated with that hash digest commenced or successfully completed.

Figure 6:
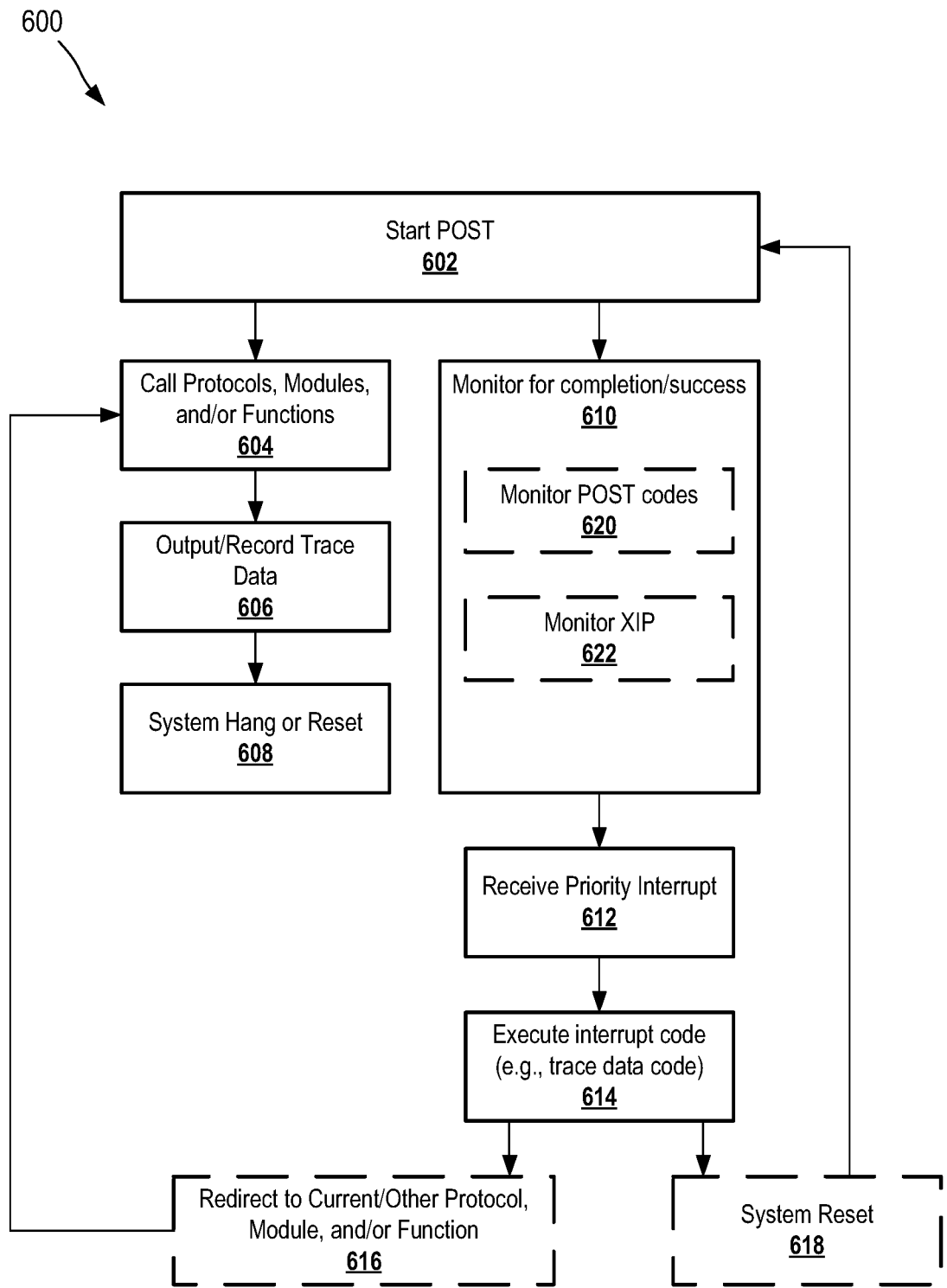
FIG. 6 is a block diagram depicting a process for failsafe outputting of trace data, according to certain aspects of the present disclosure.

FIG. 6 is a block diagram depicting a process 600 for failsafe outputting of trace data, according to certain aspects of the present disclosure. Process 600 can be performed as part of execution of a firmware, such as firmware image 102 of FIG. 1. Process 600 can be part of a POST routine, such as during bootup of a computing system. For illustrative purposes, process 600 is depicted in FIG. 6 as always failing due to a system hang or reset, although that need not always be the case.

At block 602, the POST routine can commence. Once the POST routine commences, the firmware can call protocols, modules, and/or functions at block 604. While calling these protocols, modules, and/or functions, the firmware can also monitor for completion/success at block 610. Before, during, or after execution of code associated with the protocols, modules, and/or functions of block 604, trace data can be output (e.g., recorded) at block 606. For illustrative purposes, process 600 as depicted in FIG. 6 is intended to depict a failure scenario. Thus, the calling of protocols, modules, and/or functions at block 604 is depicted as resulting in a system hang or reset at block 608. In actual use, however, successful execution of the process, modules, and/or function can result in the calling of subsequent processes, modules, and/or functions, and/or any other appropriate action in the firmware sequence.

At block 610, completion/success is being monitored. Completion/success can be monitored in any suitable way, such as through monitoring of POST codes at block 620 or monitoring of an XIP register at block 622. In some cases, monitoring completion/success can involve starting a timer (e.g., a BIOS timer or a watchdog timer) that is meant to provide sufficient time to complete one or more protocols, modules, and/or functions being called at block 604. Completion of the one or more protocols, modules, and/or functions can be identified by an expected end trigger, such as outputting of an expected POST code, identification of an expected pointer in an XIP register, or presence of any other trigger indicating success or completion of the protocol, module, and/or function. If a protocol, module, and/or function operates as intended, the end trigger would be received prior to expiration of the timer. However, if no expected end trigger is received by the time the timer expires, a priority interrupt can be sent. Sending the priority interrupt can include setting a priority interrupt. Monitoring for completion/success at block 610 can be performed by the processor executing the firmware, by the BMC, or by any other suitable component. When a priority interrupt is sent, the firmware receives the priority interrupt at block 612.

In response to receiving the priority interrupt at block 612, interrupt code of the firmware can be executed at block 614. The interrupt code can be any code designed to be executed when the priority interrupt is received, and can include trace data code. The trace data code can cause trace data to be output. In some cases, executing the trace data code can include logging an event associated with the received priority interrupt. In some cases, executing the trace data code can include recording the trace data (e.g., a trace data file) to a memory, such as a non-volatile memory.

In some cases, after the interrupt code has been executed at block 614, the firmware can optionally proceed with a system reset at block 618, which can be followed by starting the POST routine anew at 602. In some cases, after the interrupt code has been executed at block 614, the firmware can optionally proceed by redirecting execution to the current or another protocol, modules, and/or function at block 616. Redirecting to the current protocol, module, and/or function will cause the firmware to call the protocol, modules, and/or function at block 604 that was being called when the priority interrupt was received. Redirecting to another protocol, module, and/or function will cause the firmware to call a new, optionally subsequent, protocol, module, and/or function at block 604.

Figure 7:
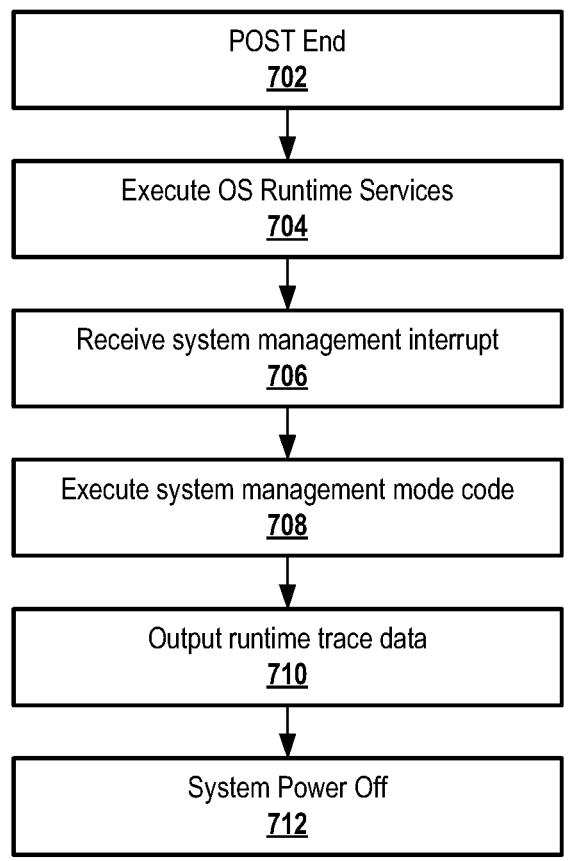
FIG. 7 is a block diagram depicting a process for generating runtime trace data during operating system runtime, according to certain aspects of the present disclosure.

FIG. 7 is a block diagram depicting a process 700 for generating runtime trace data during operating system runtime, according to certain aspects of the present disclosure. The process 700 can be performed as part of execution of a firmware, such as firmware image 102 of FIG. 1. Process 700 can occur after completion of a POST routine, as indicated by starting with POST End at block 702.

After POST End at block 702, OS runtime services can be executed at block 704. Execution of OS runtime services at block 704 can facilitate execution and ongoing operation of an operating system on the computing system.

At block 706, a system management interrupt signal can be received. Upon receiving the system management interrupt signal, system management mode code can be executed at block 708. At block 708, the system will have entered the system management mode. Before, during, or after execution of the system management mode code at block 708, runtime trace data can be output at block 710. Outputting runtime trace data can include generating trace data associated with the system management mode code and storing the runtime trace data in a suitable location, such as memory (e.g., non-volatile memory). In some cases, outputting runtime trace data at block 710 can include storing the runtime trace data in a location different than where non-runtime trace data (e.g., bootup trace data, such as trace data in trace data file 424 of FIG. 4) would normally be stored.

At block 712, the system can be powered off.

In some cases, the execution of system management mode code at block 708 can involve monitoring for completion/success as described with reference to FIG. 6, including making use of priority interrupts to ensure trace data is properly output.

Figure 8:
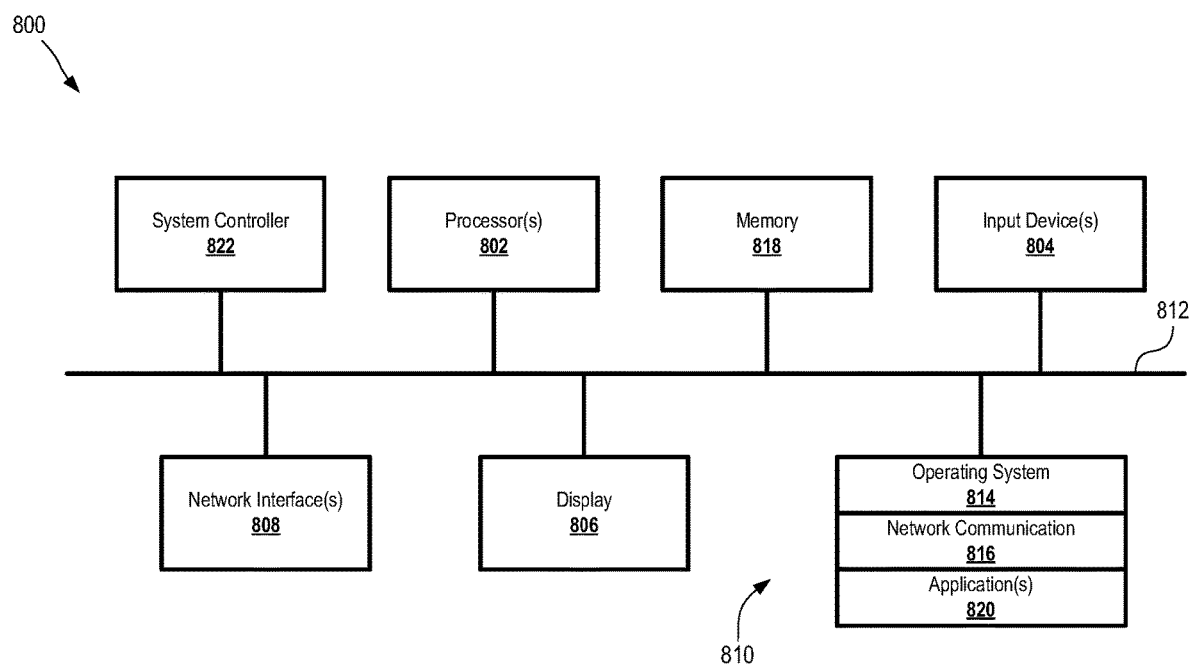
FIG. 8 is a block diagram of an example system architecture for implementing features and processes of the present disclosure.

FIG. 8 is a block diagram of an example system architecture for implementing features and processes of the present disclosure, such as those presented with reference to FIGS. 1-7. The architecture 800 can be implemented on any electronic device that runs software applications derived from compiled instructions, including without limitation personal computers, servers, smart phones, media players, electronic tablets, game consoles, email devices, and the like. In some implementations, the architecture 800 can include one or more processors 802, one or more input devices 804, one or more display devices 806, one or more network interfaces 808, and one or more computer-readable mediums 810. Each of these components can be coupled by bus 812.

In some implementations, system architecture 800 can correspond to a single server in a rack of servers. Various rack configurations can be implemented. For example, a rack can include multiple chassis and each chassis can contain multiple servers. Each server in the rack can be connected by various hardware components (e.g., backbone, middle plane, etc.).

Display device 806 can be any known display technology, including but not limited to display devices using Liquid Crystal Display (LCD) or Light Emitting Diode (LED) technology. Processor(s) 802 can use any known processor technology, including but not limited to graphics processors and multi-core processors. Input device 804 can be any known input device technology, including but not limited to a keyboard (including a virtual keyboard), mouse, track ball, and touch-sensitive pad or display. Bus 812 can be any known internal or external bus technology, including but not limited to ISA, EISA, PCI, PCI Express, NuBus, USB, Serial ATA or FireWire.

Computer-readable medium 810 can be any medium that participates in providing instructions to processor(s) 802 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 810 can include various instructions for implementing operating system 814 and applications 820 such as computer programs. The operating system can be multi-user, multiprocessing, multitasking, multithreading, real-time and the like. The operating system 814 performs basic tasks, including but not limited to: recognizing input from input device 804; sending output to display device 806; keeping track of files and directories on computer-readable medium 810; controlling peripheral devices (e.g., disk drives, printers, etc.) which can be controlled directly or through an I/O controller; and managing traffic on bus 812. Computer-readable medium 810 can include various instructions for implementing firmware processes, such as a BIOS. Computer-readable medium 810 can include various instructions for implementing any of processes 300, 400, 500, 600, 700 of FIGS. 3, 4, 5, 6, 7, respectively.

Memory 818 can include high-speed random access memory and/or non-volatile memory, such as one or more magnetic disk storage devices, one or more optical storage devices, and/or flash memory (e.g., NAND, NOR). The memory 818 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 818 can store an operating system, such as Darwin, RTXC, LINUX, UNIX, OS X, WINDOWS, or an embedded operating system such as VxWorks.

System controller 822 can be a service processor that operates independently of processor 802. In some implementations, system controller 822 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters and operating system (OS) functions.

In some implementations, the BMC runs independently of processor 802 and hence in the event of processor 802, memory 818 or any other hardware failure, the BMC can still provide services and remain functional. In some implementations, the BMC can start running as soon as a server is plugged into a power source (e.g., power supply unit, backup power unit, power distribution unit, etc.). For example, the power button on the front side of the blade does not turn on/off the BMC.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A system, comprising:
   one or more data processors; and
   a non-transitory computer-readable storage medium containing instructions which, when executed on the one or more data processors, cause the one or more data processors to perform operations including:
   accessing a firmware comprising a plurality of modules, wherein each of the plurality of modules comprises code to facilitate operation of a computing system;

running each of the plurality of modules, wherein running a module of the plurality of modules comprises:
  generating a hash digest using the module;
  outputting the hash digest;
  selecting a protocol from a plurality of protocols of the module, wherein executing the code of the module comprises executing code of the protocol;
  accessing a protocol global uniform identifier (GUID) associated with the selected protocol;
  outputting the protocol GUID associated with the selected protocol; and
  executing the code of the module.

2. The system of claim 1, wherein outputting the hash digest comprises appending the hash digest to a trace data file.

3. The system of claim 2, wherein the operations further comprise:
  receiving a priority interrupt signal; and
  outputting the trace data file in response to receiving the priority interrupt signal.

4. The system of claim 3, wherein the operations further comprise:
  initializing a timer, wherein completion of the timer is associated with non-completion of at least one of the plurality of modules; and
  sending the priority interrupt signal in response to completion of the timer.

5. The system of claim 1, wherein the firmware is a basic input/output system (BIOS).

6. A computer-implemented method, comprising:
  accessing a firmware comprising a plurality of modules, wherein each of the plurality of modules comprises code to facilitate operation of a computing system;
  running each of the plurality of modules, wherein running a module of the plurality of modules comprises:
    generating a hash digest using the module;
    outputting the hash digest;
    selecting a protocol from a plurality of protocols of the module, wherein executing the code of the module comprises executing code of the protocol;
    accessing a protocol global uniform identifier (GUID) associated with the selected protocol;
    outputting the protocol GUID associated with the selected protocol; and
    executing the code of the module.

7. The method of claim 6, wherein outputting the hash digest comprises appending the hash digest to a trace data file.

8. The method of claim 7, further comprising:
  receiving a priority interrupt signal; and
  outputting the trace data file in response to receiving the priority interrupt signal.

9. The method of claim 8, further comprising:
  initializing a timer, wherein completion of the timer is associated with non-completion of at least one of the plurality of modules; and
  sending the priority interrupt signal in response to completion of the timer.

10. The method of claim 6, wherein the firmware is a basic input/output system (BIOS).

11. A computer-program product tangibly embodied in a non-transitory machine-readable storage medium, including instructions configured to cause a data processing apparatus to perform operations including:
  accessing a firmware comprising a plurality of modules, wherein each of the plurality of modules comprises code to facilitate operation of a computing system;
  running each of the plurality of modules, wherein running a module of the plurality of modules comprises:
    generating a hash digest using the module;
    outputting the hash digest;
    selecting a protocol from a plurality of protocols of the module, wherein executing the code of the module comprises executing code of the protocol;
    accessing a protocol global uniform identifier (GUID) associated with the selected protocol;
    outputting the protocol GUID associated with the selected protocol; and
    executing the code of the module.

12. The computer-program product of claim 11, wherein outputting the hash digest comprises appending the hash digest to a trace data file.

13. The computer-program product of claim 12, wherein the operations further comprise:
  receiving a priority interrupt signal; and
  outputting the trace data file in response to receiving the priority interrupt signal.

14. The computer-program product of claim 13, wherein the operations further comprise:
  initializing a timer, wherein completion of the timer is associated with non-completion of at least one of the plurality of modules; and
  sending the priority interrupt signal in response to completion of the timer.

15. The computer-program product of claim 11, wherein the firmware is a basic input/output system (BIOS).

* * * * *